(12) United States Patent
Inagaki et al.

(10) Patent No.: US 10,407,555 B2
(45) Date of Patent: Sep. 10, 2019

(54) POLYESTER FILM CONTAINING FURANDICARBOXYLATE UNIT

(71) Applicants: TOYOBO CO., LTD., Osaka-shi, Osaka (JP); SYNVINA C.V., Amsterdam (NL)

(72) Inventors: Jun Inagaki, Otsu (JP); Katsuya Ito, Otsu (JP); Toshiyuki Shimizu, Inuyama (JP); Shoichi Gyobu, Osaka (JP); Chikao Morishige, Osaka (JP); Jesper Gabriel Van Berkel, Amsterdam (NL)

(73) Assignees: TOYOBO CO., LTD., Osaka (JP); SYNVINA C.V., Amsterdam (NL)

( * ) Notice: Subject to any disclaimer, the term of this patent is extended or adjusted under 35 U.S.C. 154(b) by 0 days.

(21) Appl. No.: 15/756,909

(22) PCT Filed: Aug. 31, 2016

(86) PCT No.: PCT/JP2016/003976
§ 371 (c)(1),
(2) Date: Mar. 1, 2018

(87) PCT Pub. No.: WO2017/038092
PCT Pub. Date: Mar. 9, 2017

(65) Prior Publication Data
US 2018/0244878 A1    Aug. 30, 2018

(30) Foreign Application Priority Data

Sep. 2, 2015  (WO) .................. PCT/JP2015/004466
Sep. 10, 2015 (WO) .................. PCT/JP2015/004625
Oct. 26, 2015 (WO) .................. PCT/JP2015/005370

(51) Int. Cl.
C08J 5/18      (2006.01)
C08G 63/16     (2006.01)

(52) U.S. Cl.
CPC ............... *C08J 5/18* (2013.01); *C08G 63/16* (2013.01); *C08J 2367/02* (2013.01)

(58) Field of Classification Search
CPC .......... C08G 63/16; C08J 2367/02; C08J 5/18
See application file for complete search history.

(56) References Cited

U.S. PATENT DOCUMENTS

| | | |
|---|---|---|
| 2,551,731 A | 5/1951 | Gordon et al. |
| 2009/0124763 A1 | 5/2009 | Matsuda et al. |
| 2012/0207956 A1 | 8/2012 | Matsuda et al. |
| 2012/0258299 A1 | 10/2012 | Matsuda et al. |
| 2015/0141584 A1 | 5/2015 | Saywell et al. |
| 2015/0307704 A1 | 10/2015 | Bhattacharjee et al. |
| 2016/0002395 A1 | 1/2016 | Matsuda et al. |
| 2016/0319066 A1 | 11/2016 | Shimoharai et al. |
| 2017/0297256 A1 | 10/2017 | Kolstad et al. |

FOREIGN PATENT DOCUMENTS

| | | |
|---|---|---|
| EP | 2511320 A1 | 10/2012 |
| JP | 4881127 B2 | 2/2012 |
| JP | 2012-229395 A | 11/2012 |
| JP | 2013-155389 A | 8/2013 |
| JP | 2014-043571 A | 3/2014 |
| JP | 2015-506389 A | 3/2015 |
| JP | 2015-098612 A | 5/2015 |
| WO | WO 2013/097013 A1 | 7/2013 |
| WO | WO 2014/100256 A2 | 6/2014 |
| WO | WO 2015/093524 A1 | 6/2015 |
| WO | WO 2016/032330 A1 | 3/2016 |

OTHER PUBLICATIONS

Hachihama et al., "Syntheses of Polyesters containing Furan Ring," *Technology Reports of the Osaka University*, 8(333): 475-480 (1958).
Japanese Patent Office, Notification of Reasons for Refusal in Japanese Patent Application No. 2017-506943 (dated Sep. 13, 2017).
European Patent Office, International Search Report in International Patent Application No. PCT/JP2016/003976 (dated Nov. 23, 2016).

*Primary Examiner* — Lawrence D Ferguson
(74) *Attorney, Agent, or Firm* — Leydig, Voit & Mayer, Ltd.

(57) ABSTRACT

To provide a furandicarboxylate unit-containing polyester film usable for industrial and packaging purposes. The film of the present invention is a polyester film, which is a biaxially oriented film of a polyester resin including a dicarboxylic acid component containing mainly a furandicarboxylic acid and a glycol component containing mainly ethylene glycol, wherein the film has a plane orientation coefficient ΔP of not less than 0.005 and not more than 0.200 and a film thickness of not thinner than 1 micro meter and not thicker than 300 micro meters.

14 Claims, 1 Drawing Sheet

Example 1
Example 3
Example 4
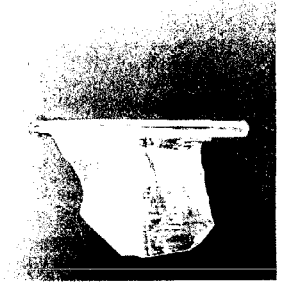
Example 6
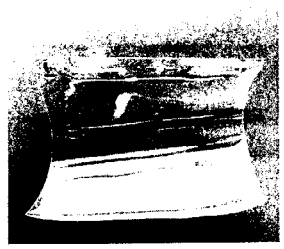
Comparative
Example 1
Comparative
Example 2

POLYESTER FILM CONTAINING FURANDICARBOXYLATE UNIT

CROSS-REFERENCE TO RELATED APPLICATIONS

This patent application is the U.S. national phase of International Patent Application No. PCT/JP2016/003976, filed Aug. 31, 2016, which claims the benefit of International Patent Application No. PCT/JP2015/004466, filed on Sep. 2, 2015, International Patent Application No. PCT/JP2015/004625, filed on Sep. 10, 2015, and International Patent Application No. PCT/JP2015/005370, filed on Oct. 26, 2015, which are incorporated by reference in their entireties herein.

TECHNICAL FIELD

The present invention relates to a thermoplastic resin composition containing a furandicarboxylate unit. More particularly, the present invention relates to a plastic film containing a furandicarboxylate unit as a main chain and excellent in mechanical properties, transparency, and heat resistance.

BACKGROUND ART

Polyester resins such as polyethylene terephthalate (PET) and polybutylene terephthalate (PBT), which are thermoplastic resins excellent in heat resistance and mechanical properties, have been used in a very wide variety of fields such as plastic films, electronics, energy, packaging materials, and automobiles. Among plastic films, biaxially stretched PET films have been used widely for industrial and packaging fields because of excellent balance between cost and mechanical strength, heat resistance, dimensional stability, chemical resistance, optical properties, etc.

In the field of industrial films, PET films can be used as functional films for flat panel displays (FPD) such as liquid crystal displays and plasma display because of having excellent transparency. Further, PET films provided with hydrolysis resistance have been used for films for solar cell back sheets and also used for various purposes such as functional films and base films.

In the field of packaging films, PET films have been used for applications such as wrapping of foodstuff, shrink labels for bottles, and gas barrier films. Particularly, films excellent in gas barrier properties have been used as packaging materials or gas shielding materials which are required to have air-tightness for foodstuff, pharmaceutical products, electronic parts, and the like, and there has been a growing demand for such films in recent years.

On the other hand, resins having biodegradability and resins produced from biomassderived raw materials have drawn attention as environmentally friendly-type and environmentally sustainable-type materials. From the above-mentioned viewpoint, many investigations have been performed for the purpose of providing a reproducible polymer for replacing petroleum derivatives such as PET. Furandicarboxylic acids (FDCA) have been proposed as compounds having similar chemical natures such as solubility in hot water and stability toward acidic reagents with terephthalic acid which is the main chain skeleton of PET and a planar structure. So it has been proposed to provide furan-based materials by polycondensation of FDCA and a diol (Patent Literature 1 and Non-Patent Literature 1).

Only the melting point in the physical properties of these polymers disclosed is made clear, and mechanical strength is unclear. It is unknown whether or not thermoplastic resin compositions containing a furandicarboxylate unit can be used in the fields of industrial and packaging films.

Polymer compounds usable for electric and electronic parts or the like by specifying the degree of polymerization have been proposed for thermoplastic resin compositions containing, mainly polybutylene furandicarboxylate (PBF), some kinds of furandicarboxylate units (Patent Literature 2). Further, polyesters excellent in mechanical strength by specifying reduced viscosity and terminal acid value have been proposed (Patent Literatures 3 and 4).

However, thermally press-molded products of PBF disclosed in Patent Literature 2 have low transparency and are thus limited for uses in the fields of industrial and packaging films. In the mechanical properties of 200 micro meters sheet products having a polyetylene furandicarboxylate (PEF) structure disclosed in Patent Literatures 3 and 4, both breaking elongation and breaking strength are low and it is not conceivable to use such sheet products in the fields of industrial and packaging films.

Sheets obtained from PEF, PEF derivatives and blends of PEF derivatives and copolymer polyesters have been investigated to be formed into uniaxially stretched films (Patent Literatures 5 and 6).

Patent Literature 5 discloses that as compared with a sheet made of a thermoplastic resin composition containing a furandicarboxylate unit, a film obtained by uniaxially stretching the sheet at 5 to 16 times is improved in breaking elongation, depending on the kinds of blends and the blending ratio of furandicarboxylate unit. However, no significant improvement in breaking elongation is confirmed unless cyclohexanedimethanol-copolymerized PET, which is widely known for improving breaking elongation, is blended. It must be said that the effect is limited depending on the blending ratio and the film has not been used so far in the fields of industrial and packaging films.

Patent Literature 6 discloses a PEF film uniaxially stretched about 1.6 times by using rolling rolls. The film is shown to be a plastic film excellent in gas barrier properties, but it merely mentions the advantages of barrier properties derived from chemical structure of PEF, and mechanical strength which is important for packaging materials is not made clear, so that the film has not been used so far in the field of gas barrier film containing a furandicarboxylate unit for packaging.

CITATION LIST

Patent Literature

[PTL 1]
U.S. Pat. No. 2,551,731
[PTL 2]
Japanese Patent No. 4881127
[PTL 3]
JP-A-2013-155389
[PTL 4]
JP-A-2015-098612
[PTL 5]
JP-T-2015-506389
[PTL 6]
JP-A-2012-229395

Non Patent Literature

[NPL 1]
Y. Hachihama, T. Shono, and K. Hyono, Technol. Repts. Osaka Univ., 8, 475 (1958)

SUMMARY OF INVENTION

Technical Problem

Currently, the resin compositions containing furandicarboxylate units proposed in the above-mentioned patent literatures have been investigated for replacing PET. But because of inferior mechanical properties, the resin compositions cannot be used for industrial and packaging films. Further, no investigation is performed on heat resistance and transparency, and it is unknown whether or not the resin compositions are applicable in the fields of industrial and packaging films.

An object of the present invention is to provide a furandicarboxylate unit-containing polyester film usable for industrial and packaging purposes. That is, the object is to provide a polyester film containing a furandicarboxylate unit as a main chain and excellent in mechanical properties, transparency, and heat resistance.

Solution to Problem

The film of the present invention is (1) a polyester film, which is a biaxially oriented film of a polyester resin comprising a dicarboxylic acid component containing mainly a furandicarboxylic acid and a glycol component containing mainly ethylene glycol, wherein the film has a plane orientation coefficient $\Delta P$ of not less than 0.005 and not more than 0.200 and a film thickness of not thinner than 1 micro meter and not thicker than 300 micro meters.

(2) The polyester film according to (1) preferably has a heat shrinkage rate of not less than 0.01% and not more than 50% when heated at 150° C. for 30 minutes.

(3) The polyester film according to (1) or (2) preferably has an oxygen permeability of not less than 1 mL/m$^2$/day/MPa and not more than 200 mL/m$^2$/day/MPa per 50 micro meters of film thickness under a temperature of 23° C. and a humidity of 65%.

(4) The polyester film according to any one of (1) to (3) preferably has a refractive index of not less than 1.5700 and not more than 1.7000 in a machine direction of film plane (nx) and in a transverse direction perpendicular to the machine direction (ny).

(5) The polyester film according to any one of (1) to (4) preferably has a heat shrinkage rate of not less than 0.01% and not more than 30% when heated at 150° C. for 30 minutes.

(6) The polyester film according to any one of (1) to (5) preferably has a heat shrinkage rate of not less than 0.01% and not more than 20% when heated at 150° C. for 30 minutes.

(7) The polyester film according to any one of (1) to (6) preferably has a heat shrinkage rate of not less than 0.01% and not more than 10% when heated at 150° C. for 30 minutes.

(8) The polyester film according to any one of (1) to (7) preferably has a plane orientation coefficient $\Delta P$ of not less than 0.100 and not more than 0.200.

The present invention also contains (9) a method for producing the polyester film according to any one of (1) to (8), comprising a stretching process for stretching an unstretched film in the machine direction and in the direction perpendicular to the machine direction to obtain a stretched film, and a relaxation process for relaxing the stretched film.

Advantageous Effects of Invention

The polyester film containing a furandicarboxylate unit of the present invention can be used preferably as industrial and packaging films since the polyester film has excellent mechanical properties, transparency and heat resistance. According to further preferable embodiments, the present invention can provide a packaging material or a gas shielding material which has strength and heat stability surprisingly as high as those of PET film, has gas shielding property extremely higher than that of PET film, and is usable for foodstuff, pharmaceutical products, electronic parts, and the like which are required to be in air-tightness.

BRIEF DESCRIPTION OF DRAWINGS

The FIGURE depicts images of the films of Examples 1, 3, 4, and 6 and Comparative Examples 1 and 2 after a heat resistance test.

DESCRIPTION OF EMBODIMENTS

The polyester film of the present invention is made of a polyethylene furandicarboxylate-based resin containing mainly a furandicarboxylic acid as a dicarboxylic acid component and mainly ethylene glycol as a glycol component. The polyethylene furandicarboxylate-based resin contains ethylene glycol and 2,5-furandicarboxylic acid as main constituent components.

To an extent that the object of the present invention is not hindered, other dicarboxylic acid components and glycol components may be copolymerized. The amount of the other dicarboxylic acid components and that of the glycol components to be copolymerized are preferably in a range of not more than 20 mol %, more preferably not more than 10 mol %, and particularly preferably not more than 5 mol %, respectively, to all of the dicarboxylic acid components or to all of the diol components.

Examples of the other dicarboxylic acids include aromatic dicarboxylic acids such as terephthalic acid, isophthalic acid, phthalic acid, naphthalene dicarboxylic acid, 4,4'-dicaroboxybiphenyl, and sodium 5-sulfoisophthalate; alicyclic dicarboxylic acids such as 1,4-cyclohexanedicarboxylic acid, 1,3-cyclohexanedicarboxylic acid, 1,2-cyclohexanedicarboxylic acid, 2,5-norbornenedicarboxylic acid, and tetrahydrophthalic acid; and aliphatic dicarboxylic acid such as oxalic acid, malonic acid, succinic acid, adipic acid, azelaic acid, sebacic acid, undecanedioic acid, dodecanedioic acid, octadecanedioic acid, fumaric acid, maleic acid, itaconic acid, mesaconic acid, citraconic acid, and dimer acid; and so forth. Examples of the other glycol components include aliphatic glycols such as 1,2-propanediol, 1,3-propanediol, 1,2-butanediol, 1,3-butanediol, 1,4-butanediol, 2-methyl-1,3-propanediol, 2-amino-2-ethyl-1,3-propanediol, 2-amino-2-methyl-1,3-propanediol, 1,10-decanediol, dimethyloltricyclodecane, diethylene glycol, and triethylene glycol; ethylene oxide adducts and propylene oxide adducts of bisphenol A, bisphenol S, bisphenol C, bisphenol Z, bisphenol AP, and 4,4'-biphenol; alicyclic glycols such as 1,2-cyclohexanedimethanol, 1,3-cyclohexanedimethanol, and 1,4-cyclohexanedimethanol; polyethylene glycol; polypropylene glycol; and so forth.

Methods employable as a polymerization method for such a polyethylene furandicarboxylate-based resin may be any production method such as a direct polymerization method in which a furandicarboxylic acid component is allowed to directly react with ethylene glycol, and if necessary, together with other dicarboxylic acid components and diol components; a transesterification method in which the transesterification reaction of a dimethyl ester of a furandicarboxylic acid (including methyl esters of other dicarboxylic acids, if necessary) with ethylene glycol (including other diol components, if necessary) is performed; and so forth.

The polyethylene furandicarboxylate-based resin can contain other resin such as polyamide, polystyrene, polyolefin, and other polyester, but in terms of mechanical characteristic and heat resistance, the ratio of the other resin is preferably not more than 30 mass %, more preferably not more than 20 mass %, and particularly preferably not more than 10 mass %, even more preferably not more than 5 mass % in all resin of the film. The most preferably, the resin of the film consists essentially of the polyethylene furandicarboxylate-based resin.

The intrinsic viscosity of the polyethylene furandicarboxylate-based resin preferably falls within a range of preferably not less than 0.30 dl/g and not more than 1.20 dl/g, more preferably not less than 0.55 dl/g and not more than 1.00 dl/g, even more preferably not less than 0.70 dl/g and not more than 0.95 dl/g. If the intrinsic viscosity is less than 0.30 dl/g, a film obtained tends to be torn, and if the intrinsic viscosity is more than 1.20 dl/g, the filtration pressure increases and high precision filtration is difficult to be performed, so that resin extrusion through a filter is difficult to be performed.

The intrinsic viscosity of the polyester film of the present invention preferably falls within a range of preferably not less than 0.30 dl/g and not more than 1.20 dl/g, more preferably not less than 0.55 dl/g and not more than 1.00 dl/g, even more preferably not less than 0.70 dl/g and not more than 0.95 dl/g. If the intrinsic viscosity is more than 0.30 dl/g, a film obtained tends to increase in mechanical properties when the intrinsic viscosity of the polyester film is high, and if the intrinsic viscosity is more than 1.20 dl/g, the mechanical properties are saturated.

The polyester film of the present invention has a plane orientation coefficient ($\Delta P$) of not less than 0.005 and not more than 0.200, preferably not less than 0.020 and not more than 0.195, more preferably not less than 0.100 and not more than 0.195, even preferably not less than 0.120 and not more than 0.195, further even more preferably not less than 0.140 and not more than 0.190, and especially preferably not less than 0.140 and not more than 0.160. If the plane orientation coefficient ($\Delta P$) is less than 0.005, the mechanical properties of the film become insufficient, so that post-processing such as printing on the film and bag production from the film may be difficult to be performed, and the film may be cut on a printer or a coater when post-printing or post-coating is performed, and therefore it is not preferable. If $\Delta P$ is 0.160 or less, the mechanical strength of the film becomes sufficient. The plane orientation coefficient can be calculated as follows: the refractive index (nx) in the machine direction (MD) of the film plane as well as the refractive index (ny) in the direction perpendicular to MD (transverse direction (TD)), and the refractive index (nz) in the thickness direction are measured in accordance with JIS K 7142-1996 5.1 (method A) using Abbe refractometer in which a light source is a sodium D line, and the plane orientation coefficient ($\Delta P$) is calculated based on the following equation: $\Delta P = \{(nx+ny)-2nz\}/2$.

The polyester film of the present invention has a heat shrinkage rate of preferably not more than 50%, more preferably not more than 30%, even more preferably not more than 20%, further even more preferably not more than 10%, especially preferably not more than 8%, and most preferably not more than 4.5% in both MD and TD when heated at 150° C. for 30 minutes. If the heat shrinkage rate is high, color deviation occurs at the time of printing, printing and coating are difficult to be performed due to elongation of the film on a printer and a coater, and appearance becomes inferior because of deformation of the film by high temperature heating. It is preferable when the heat shrinkage rate is low, but in terms of production, the lower limit of the heat shrinkage rate is supposed to be 0.01%.

In the present invention, the oxygen permeability per 50 micro meters of film thickness under a temperature of 23° C. and a humidity of 65% is preferably not less than 1 mL/m$^2$/day/MPa, and preferably not more than 200 mL/m$^2$/day/MPa, more preferably not more than 50 mL/m$^2$/day/MPa, even more preferably not more than 40 mL/m$^2$/day/MPa, and further even more preferably not more than 30 mL/m$^2$/day/MPa. If the oxygen permeability exceeds 200 mL/m$^2$/day/MPa, preservation properties for materials and foodstuff to be deteriorated by oxygen may become inferior. In terms of production, the lower limit of the oxygen permeability is supposed to be 1 mL/m$^2$/day/MPa.

In the present invention, the oxygen permeability of the film under a temperature of 23° C. and a humidity of 65% is preferably not less than 1 mL/m$^2$/day/MPa, and preferably not more than 1000 mL/m$^2$/day/MPa, more preferably not more than 500 mL/m$^2$/day/MPa, even more preferably not more than 200 mL/m$^2$/day/MPa, and further even more preferably not more than 120 mL/m$^2$/day/MPa. If the oxygen permeability exceeds 1000 mL/m$^2$/day/MPa, preservation properties for materials and foodstuff to be deteriorated by oxygen may become inferior. In terms of production, the lower limit of the oxygen permeability is supposed to be 1 mL/m$^2$/day/MPa. The oxygen permeability described herein is the oxygen permeability of the film itself, and naturally, it is possible to improve the oxygen permeability by subjecting the film to coating, metal deposition, metal oxide deposition, sputtering, co-extrusion and the like.

In the present invention, the water vapor permeability per 50 micro meters of film thickness under a temperature of 37.8° C. and a humidity of 90% is preferably not less than 0.1 g/m$^2$/day, and preferably not more than 10 g/m$^2$/day, more preferably not more than 8 g/m$^2$/day, even more preferably not more than 5 g/m$^2$/day. If the water vapor permeability exceeds 10 g/m$^2$/day, preservation properties for materials and foodstuff to be deteriorated by water vapor may become inferior. In terms of production, the lower limit of the water vapor permeability is supposed to be 0.1 g/m$^2$/day.

In the present invention, the water vapor permeability of the film under a temperature of 37.8° C. and a humidity of 90% is preferably not less than 0.1 g/m$^2$/day, and preferably not more than 40 g/m$^2$/day, more preferably not more than 30 g/m$^2$/day, even more preferably not more than 20 g/m$^2$/day. If the water vapor permeability exceeds 40 g/m$^2$/day, preservation properties for materials and foodstuff to be deteriorated by water vapor may become inferior. In terms of production, the lower limit of the water vapor permeability is supposed to be 0.1 g/m$^2$/day.

In the film of the present invention, the polyester film containing a furandicarboxylate unit itself has a high oxygen barrier property (that is, low oxygen permeability), but the property can be made further high by performing a stretching step described below.

The refractive index (nx) in MD of the film plane and the refractive index (ny) in the direction perpendicular to MD are preferably not less than 1.5700, more preferably not less than 1.6000, and even more preferably not less than 1.6200. If nx and ny are not less than 1.5700, sufficient breaking strength and breaking elongation of the film can be obtained, so that the mechanical properties of the film can be satisfactory, postprocessing such as printing on the film and bag production from the film can be performed easily, and the film is difficult to be cut on a printer or a coater when post printing or post coating is performed, and therefore it is preferable. In terms of production and heat shrinkage rate, the upper limit of the refractive index is preferably less than 1.7000.

The polyester film of the present invention has a breaking strength of preferably not less than 75 MPa in both MD and TD. The lower limit of the breaking strength is preferably 100 MPa, more preferably 150 MPa, even more preferably 200 MPa, and further even more preferably 220 MPa. If the breaking strength is less than 75 MPa, the mechanical strength of the film becomes insufficient, defects such as elongation and deviation tend to be generated in the film processing, and therefore it is not preferable. In consideration of production, the upper limit of the breaking strength is 1000 MPa.

The polyester film of the present invention has a breaking elongation of preferably not less than 10% in both MD and TD. The lower limit of the breaking elongation is preferably 15%, more preferably 20%, and particularly preferably 30%. If the breaking strength is less than 10%, the breaking elongation of the film becomes insufficient, defects such as cracking and tearing tend to be generated in the film processing, and therefore it is not preferable. In consideration of production, the upper limit of the breaking elongation is 300%. The upper limit of the breaking elongation is preferably 150%, more preferably 100%, even more preferably 80%.

The polyester film of the present invention has a total light transmittance of not less than 75%. In order to improve the detection precision of internal foreign matter that becomes a defect of the film, the transparency is desirably high. For this reason, the polyester film of the present invention has a total light transmittance of preferably not less than 75%, more preferably not less than 80%, even more preferably not less than 88.5%, and especially preferably not less than 89%. In order to improve the detection precision of internal foreign matter that becomes a defect of the film, the higher the total light transmittance is, the better it is, but it is technically difficult to achieve a total light transmittance of 100%.

The polyester film the present invention has a haze of preferably not more than 15%. In order to inspect defects of contents in uses for packaging foodstuff, the film desirably has less opacity. For this reason, the polyester film of the present invention has a haze of preferably not more than 15%, more preferably not more than 8%, even more preferably not more than 3%, and preferably not more than 1%. The haze is preferably low, but in terms of the intrinsic refractive index of the polyester film containing a furandicarboxylate unit, the lower limit of the haze is supposed to be 0.1%.

The thickness of the polyester film of the present invention is not thinner than 1 micro meter to not thicker than 300 micro meters, preferably not thinner than 5 micro meters to not thicker than 200 micro meters, even more preferably not thinner than 10 micro meters to not thicker than 100 micro meters, and further more preferably not thinner than 10 micro meters to not thicker than 40 micro meters. If the thickness exceeds 300 micro meters, it would be problematic in terms of cost, and when the film is used as a packaging material, visibility tends to be lowered. On the other hand, if the thickness is thinner than 1 micro meter, the mechanical properties are lowered and the film may fail to perform as its own function.

A method for producing the polyester film of the present invention will be described. A representative example of using PEF pellets will be described in detail, but naturally, the present invention is not limited thereto.

First, film raw materials are dried or hot-air dried to adjust the water content of the raw materials to less than 100 ppm. Next, the respective raw materials are weighed and mixed, and the mixture is supplied to an extruder, and then melt-extruded into a sheetlike form. The sheet in a melted state is closely attached to a rotating metal roll (casting roll) by an electrostatic application method and then solidified with cooling so that an unstretched PEF sheet is obtained.

At an arbitrary site where the melted resin is kept at 220 to 280° C., high precision filtration is performed in order to remove a foreign matter contained in the resin. A filter medium to be used for the high precision filtration of the melted resin is not particularly limited, but a filter medium made of a stainless steel sintered body is excellent in performance of removing agglomerates containing Si, Ti, Sb, Ge or Cu as a main component and high melting point organic matters, and is thus suitable.

In the case of layering a surface layer (a layer) and an intermediate layer (b layer) by co-extrusion, raw materials for the respective layers are extruded by using at least two extruders, and both layers are joined by using a multilayer feed block (e.g., joining block having a rectangular joining part). The joined product is extruded into a sheetlike form from a slit-like die, and solidified with cooling on a casting roll to obtain an unstretched film. Alternatively, a multi-manifold die may be used in place of the multilayer feed block.

Next, the unstretched film obtained in the above-mentioned manner is biaxially stretched and successively subjected to a heat treatment.

For example, when a biaxially oriented polyester film containing a furandicarboxylate unit is produced, employable methods may be a sequential biaxial stretching method in which uniaxial stretching is performed in MD or TD and then stretching is performed in the perpendicular direction; a simultaneous biaxial stretching method in which stretching is performed simultaneously in both MD and TD; and a simultaneous biaxial stretching method in which a linear motor is used as driving means. In the case of sequential biaxial stretching method, the MD stretching can be performed by making a speed difference using heating rolls to stretch a sheet in MD. An infrared heater may be used in combination for heating. The successively following TD stretching can be performed by leading the vertically stretched sheet to a tenter, clipping both ends of the stretched sheet with clips, and stretching the sheet in the TD while heating the sheet. The resulting film after the TD stretching is continuously subjected to a heat treatment in the tenter. The heat treatment may be performed while the film is stretched in TD, and also may be performed while the film relaxes in TD. The film after the heat treatment can be wound by a winder after its both ends are cut off.

Patent Literature 5 and 6 disclose a production method for a PEF or PEF derivatives film uniaxially stretched at 1.6 to 16 times. However, the disclosed method cannot provide mechanical properties sufficient for industrial and packaging purposes. Accordingly, the present inventors have made investigations and consequently have attained high mechanical properties by performing the following stretching methods (1) to (7).

(1) Control of Stretch Ratio in MD of Film

It is necessary that stretching in MD in a range of 1.1 to 10.0 times is performed to obtain the polyester film of the present invention. A film having a plane orientation coefficient ΔP of more than 0.005 can be produced by MD stretching at 1.5 times or more. The stretch ratio in MD is preferably 2.5 times or more, more preferably 3.5 times or more, even more preferably 4 times or more, and especially preferably 4.5 times or more. By setting the stretch ratio to 2.5 times or more, it is possible to make the film excellent in mechanical properties of having ΔP of not less than 0.02, refractive indexes nx and ny of not less than 1.5700 in MD and TD, a film breaking strength of not less than 100 MPa, and a film breaking elongation of not less than 15%. If the stretch ratio is not more than 10.0 times, the frequency of breaking the film tends to be low, and therefore it is preferable.

(2) Control of Stretch Temperature in MD of Film

It is desirable that stretching in MD in a range of not lower than 90° C. to not higher than 150° C. is performed to obtain the polyester film of the present invention. The temperature is more preferably not lower than 100° C. to not higher than 125° C. If the stretch temperature in MD is not lower than 90° C., the frequency of breaking the film tends to be low, and therefore it is preferable. If the stretch temperature is not higher than 150° C., stretching can be performed evenly, and therefore it is preferable.

(3) Control of Stretch Ratio in TD of Film

It is desirable that stretching in TD in a range of 1.1 to 10.0 times is performed to obtain the polyester film of the present invention. A film having a plane orientation coefficient ΔP of more than 0.005 can be produced by TD stretching at 1.5 times or more. The stretch ratio in MD is preferably 3.0 times or more, more preferably 3.5 times or more, even more preferably 4 times or more, and especially preferably 4.5 times or more. By setting the stretch ratio to 3.0 times or more, it is possible to make the film excellent in mechanical properties of having ΔP of not less than 0.02, refractive indexes nx and ny of not less than 1.5700 in MD and TD, a film breaking strength of not less than 75 MPa, and a film breaking elongation of not less than 15%. If the stretch ratio is not more than 10.0 times, the frequency of breaking the film tends to be low, and therefore it is preferable.

(4) Control of Temperature for Stretching in TD of Film

It is desirable that stretching in TD in a range of not lower than 80° C. to not higher than 200° C. is performed to obtain the polyester film of the present invention. The temperature is more preferably not lower than 95° C. to not higher than 135° C. If the stretch temperature in TD is not lower than 80° C., the frequency of breaking the film tends to be low, and therefore it is preferable. If the stretch temperature is not higher than 200° C., stretching can be performed evenly, and therefore it is preferable.

(5) Control of Heat Fixation Temperature for Film

It is desirable that a heat fixation treatment is performed in a range of not lower than 110° C. to not higher than 220° C. to obtain the polyester film of the present invention. If the temperature for the heat fixation treatment is not higher than 220° C., preferably not higher than 210° C., the film hardly becomes opaque and the frequency of melt breaking of the film tends to be low, and therefore it is preferable. If the heat fixation temperature is made high, the heat shrinkage rate is lowered, and therefore it is preferable. The heat fixation temperature is more preferably not lower than 120° C., even more preferably not lower than 140° C., further even more preferably not lower than 160° C., and particularly preferably not lower than 175° C. The plane orientation coefficient ΔP tends to be high by the heat fixation treatment.

(6) Control of Relaxation Temperature in TD of Film

It is desirable that a relaxation treatment is performed in TD in a range of not lower than 100° C. to not higher than 200° C. to obtain the polyester film of the present invention. The temperature is preferably not lower than 165° C. and not higher than 195° C. This can lower the heat shrinkage rate, and therefore it is desirable.

(7) Control of Relaxation Ratio in TD of Film

It is desirable that a relaxation ratio in TD is set to a range of not less than 0.5% to not more than 10.0% to obtain the polyester film of the present invention. The relaxation ratio is preferably not less than 2% and not more than 6%. This can lower the heat shrinkage rate, and therefore it is desirable.

The film of the present invention can be produced by a method for producing the polyester film comprising a stretching process for stretching an unstretched film in the machine direction and in the direction perpendicular to the machine direction to obtain a stretched film, and a relaxation process for relaxing the stretched film. But the invention should not be limited to the specifically disclosed methods described above as long as methods are within the scope of the technical idea. It is important for the production of the film of the present invention that the above production conditions are controlled highly and precisely in the extremely narrow ranges based on the technical idea.

In the polyester film of the present invention, the breaking strength, breaking elongation and heat shrinkage rate of the film can be controlled by the stretching condition and the heat treatment condition described above singly or in combination. The conditions may be selected arbitrarily, but as for the preferable conditions, a film can be obtained which has a plane orientation coefficient (ΔP) of not less than 0.140, a heat shrinkage rate of not more than 8% (preferably 4.5%), a film breaking strength of not less than 150 MPa (preferably 250 MPa), and a film breaking elongation of not less than 40% by the combination of preferable conditions (1) to (7). It is effective that the stretch ratio in MD is larger, the stretch ratio in TD is larger, and the temperature for the heat fixation treatment is higher for obtaining a film having a heat shrinkage rate of not more than 8% and breaking strength of not less than 150 MPa. Concretely, it is effective that the stretch ratio in MD is preferably 4 times or more (more preferably 4.5 times or more), the stretch ratio in TD is preferably 4 times or more (more preferably 4.5 times or more), and the temperature for the heat fixation treatment is preferably 165° C. or more for obtaining a film having a heat shrinkage rate of not more than 8% and breaking strength of not less than 150 MPa.

During the stretching step or on completion of the stretching of the film, a corona treatment or a plasma treatment may be performed. Further, resins, crosslinking agents, and particles may be mixed properly, and a liquid dissolved in a solvent or a dispersion may be used for coating to provide slipping property, anti-blocking property, antistatic property, easy adhesive property, and the like. Various kinds of stabilizers, pigments, UV absorbers and the like may be added to the film of the present invention.

The film which has been subjected to stretching and heat treatment may be surfacetreated to improve its function. The surface treatment may be, for example, printing and coating, metal deposition, metal oxide deposition, sputtering treatment, and the like.

EXAMPLES

Next, the effects of the present invention will be explained with reference to Examples and Comparative Examples. First, methods for evaluating property values used in the present invention will be described as follows.

(1) Breaking Strength and Breaking Elongation

Samples each in a strip form of 140 mm length and 10 mm width were cut out in MD and TD of each film by a cutter. Next, each strip form sample was pulled by Autograph AG-IS (manufactured by Shimadzu Corporation) to measure the breaking strength (MPa) and the breaking elongation (%) in the respective directions from the load-strain curve obtained.

The measurement was performed under conditions of an atmosphere of 25° C., a chuck distance of 40 mm, a crosshead speed of 100 mm/min, and a load cell of 1 kN. The measurement was repeated 5 times and the average value thereof was employed.

(2) Plane Orientation Coefficient (ΔP)

The plane orientation coefficient was calculated as follows: the refractive index (nx) in MD of the film plane as well as the refractive index (ny) in the direction perpendicular to MD and the refractive index (nz) in the thickness direction were measured in accordance with JIS K 7142-1996 5.1 (method A) using Abbe refractometer in which a light source is a sodium D line, and the plane orientation coefficient (ΔP) was calculated based on the following equation:

$$\Delta P=\{(nx+ny)-2nz\}/2.$$

(3) Total Light Transmittance and Haze

The measurement was carried out in accordance with JIS K 7136 "Plastics: Method of Determining Haze of Transparent Materials". A NDH-5000 model turbidity meter manufactured by NIPPON DENSHOKU INDUSTRIES Co., Ltd. was used as a measurement meter.

(4) Heat Shrinkage Rate (Heat Shrinkage Rate in MD and TD)

Each film was cut out in a size of 10 mm width and 250 mm length to the direction for the measurement and marked at every 150 mm interval. The intervals (A) between marks were measured under a constant tension of 5 gf. Next, each film was put in an oven in an atmosphere of 150° C. and subjected to a heat treatment at 150±3° C. for 30 minutes without load. Thereafter, the intervals (B) between marks were measured under a constant tension of 5 gf. The heat shrinkage rate was calculated based on the following equation:

$$\text{Heat shrinkage rate (\%)}=100(A\cdot B)/A.$$

(5) Oxygen Permeability

The measurement was performed using an oxygen permeability measurement apparatus (OX-TRAN2/21, manufactured by MOCON Inc.) under conditions of a temperature of 23° C. and a humidity of 65%.

(6) Water Vapor Permeability

The measurement was performed using a water vapor permeability measurement apparatus (PERMATRAN-W3/33, manufactured by MOCON Inc.) under conditions of a temperature of 37.8° C. and a humidity of 90%.

(7) Intrinsic Viscosity (IV)

After crushed and dried, each polyester resin was dissolved in a mixed solvent of pchlorophenol and tetrachloroethane (75/25 in weight ratio). The flow time of each solution having a concentration of 0.4 (g/dl) and the flow time of the solvent alone were measured using an Ubbelohde viscometer at 30° C., and their time ratio was employed to calculate intrinsic viscosity according to Huggins' expression, assuming that the Huggins' constant was 0.38.

(8) Film Thickness

Four 5 cm-square samples were cut out from arbitrary 4 positions of each film to be measured and subjected to thickness measurement at 5 points of each sample (20 points in total) by using Millitron. The average value thereof was employed as thickness.

(9) Oxygen Permeability Test for Packaging Container (i) Production of Coloring Solution A glass container is loaded with 2 L of water and 6.6 g of powdered agar and put in hot water at 95° C. and heated for 1 hour or longer to completely dissolve the agar. The solution is filtered using a 50 mesh metal net to remove the gelled foreign matters. The solution is mixed with 0.04 g of methylene blue. The solution is further evenly mixed with 1.25 g of sodium hydrosulfide in a glove box in which nitrogen has previously been allowed to flow through for 15 minutes or longer to obtain a coloring solution (colorless).

(ii) Production of Packaging Container for Film

A three sides-sealed bag having an inner size of 70 mm width and 105 mm length is produced.

(iii) Charge with Coloring Solution

The three sides-sealed bag is charged with about 30 mL of the coloring solution in the glove box in which nitrogen has previously been allowed to flow through for 15 minutes or longer. The three sides-sealed bag is filled with nitrogen and thereafter closed with a sealer, so that a packaging container filled with the coloring solution can be obtained.

(iv) Oxygen Permeability Test

After the agar is solidified at room temperature, the packaging container filled with the coloring solution is transferred to a thermostatic chamber at 40° C. and color change is observed after 24 hours. The color change was determined according to the following standard, and those marked with the following "A" were regarded as acceptable.

A: Almost no color change
B: Significant color change

(10) Heat Resistance Test for Film

Each film sample in a size of 100 mm length and 100 mm width is made available by cutting. Each film sample is put in an oven heated to 130° C. for 5 minutes and its appearance change is observed. The appearance change was evaluated according the following standard, and those marked with the following "A", "B", and "C" were regarded as acceptable.

A: Almost no appearance change
B: Generally equivalent to the level of the above "A", but deformation is observed only in film ends
C: A small appearance change is observed
D: Significant appearance change is observed

Example 1

Poly(ethylene 2,5-furandicarboxylate) having an IV of 0.90 manufactured by Avantium was used as a raw material. After dried under reduced pressure (1 Torr) at 100° C. for 24 hours, the raw material was supplied to a biaxial extruder (screw diameter: 30 mm, L/D=25). The raw material supplied to the biaxial extruder was melted and extruded into a sheet-like form out of a T-die (a metal cap) while the resin temperature was kept at 270° C. from the melting part through the kneading part, the polymer tube (the tube for melted raw material), and the gear pump of the extruder and kept at 275° C. in the subsequent polymer tube (the tube for melted raw material).

The resin extruded was cast on a cooling drum having a surface temperature of 20° C., closely attached to the surface of the cooling drum by electrostatic application method, and thus solidified with cooling to produce an unstretched film having a thickness of 250 micro meters.

The unstretched sheet obtained was heated by a group of rolls each was heated to 120° C. to increase the film temperature, and thereafter stretched in MD at 5.0 times by a group of rolls each having a different peripheral speed.

Next, the uniaxially stretched film obtained was led to a tenter and held by clips, so that the film was subjected to transverse stretching. The conveying speed was set to 5 m/min. The temperature for transverse stretching was set to 105° C., and the transverse stretch ratio was set to 5.0 times. Successively, the film was subjected to a heat treatment at 200° C. for 12 seconds, and then subjected to a 5% relaxation treatment at 190° C. to obtain a polyester film containing a furandicarboxylate unit. The physical properties of the film obtained are shown in Table 1.

Example 2

A film was obtained in the same manner as in Example 1, except that the thickness of the unstretched film was set to 300 micro meters. The physical properties of the film obtained are shown in Table 1.

Examples 3 to 6

Films were obtained in the same manner as in Example 1, except that the conditions for film formation were changed as shown in Table 1. The physical properties of the films obtained are shown in Table 1.

Example 7

A film was obtained in the same manner as in Example 1, except that the raw material to be used was changed to a dry blend of poly(ethylene 2,5-furandicarboxylate) having an IV of 0.80 manufactured by Avantium and poly(ethylene 2,5-furandicarboxylate) having an IV of 0.70 manufactured by Avantium (50:50 in ratio), and the conditions for film formation were changed as shown in Table 1. The physical properties of the film obtained are shown in Table 1.

Example 8

A film was obtained in the same manner as in Example 1, except that the conditions for film formation were changed as shown in Table 1. The physical properties of the film obtained are shown in Table 1.

Comparative Example 1

The unstretched film having a thickness of 250 micro meters obtained in Example 1 was used as Comparative Example 1.

Comparative Example 2

The unstretched sheet obtained in Example 1 was heated by a group of rolls each was heated to 100° C. to increase the film temperature, and thereafter stretched in MD at 5.0 times by a group of rolls each having a different peripheral speed, so that a uniaxially stretched film was obtained. The physical properties of the film obtained are shown in Table 1.

Comparative Example 3

(1) Production of PET Resin (A)

An esterification reactor was heated, and at the time when the temperature was reached 200° C., the reactor was charged with a slurry containing 86.4 parts by mass of terephthalic acid and 64.4 parts by mass of ethylene glycol, and then added with 0.017 parts by mass of antimony trioxide as a catalyst and 0.16 parts by mass of trimethylamine under stirring. Next, the temperature was raised under pressure and an esterification reaction under pressure was performed in the conditions of a gauge pressure of 3.5 kgf/cm$^2$ and a temperature of 240° C. Thereafter, the inside pressure of the esterification reactor was back to normal pressure, and 0.071 parts by mass of magnesium acetate tetrahydrate and successively 0.014 parts by mass of trimethyl phosphate were added thereto. The reactor was further heated to 260° C. over 15 minutes, and 0.012 parts by mass of trimethyl phosphate and successively 0.0036 parts by mass of sodium acetate were added thereto. After 15 minutes, the esterification reaction product obtained was transferred to a polycondensation reactor, gradually heated from 260° C. to 280° C. under reduced pressure, and then subjected to a polycondensation reaction at 285° C.

On completion of the polycondensation reaction, the reaction product was filtered by a nylon filter having a 95% cut diameter of 5 micro meters, extruded from a nozzle in a strand-like form, cooled and solidified with using cooling water which had been previously subjected to a filter treatment (pore diameter: 1 micro meter or less), and cut into pellets. The PET resin (A) obtained had a melting point of 257° C. and an intrinsic viscosity of 0.62 dl/g. The PET resin (A) contained substantially no inactive particle and no internally-deposited particle.

(2) Production of PET Resin (B)

Polyethylene terephthalate containing 2000 ppm of silica particles (Sylysia 310, average particle diameter of 2.7 micro meters, manufactured by Fuji Silysia Chemical Ltd.) as an additive was produced in the same production manner as that for the PET (A) resin.

(3) Production of Biaxially Stretched Polyethylene Terephthalate Film

Pellets of 70 parts by mass of the PET resin (A) and 30 parts by mass of the PET resin (B) as raw materials for a surface layer (a) were mixed and dried under reduced pressure (1 Torr) at 135° C. for 6 hours, and thereafter supplied to an extruder 1. Pellets of 82 parts by mass of the PET resin (A) and 18 parts by mass of the PET resin (B) as raw materials for an intermediate layer (b) were mixed and dried under reduced pressure (1 Torr) at 135° C. for 6 hours, and thereafter supplied to an extruder 2. The respective raw materials supplied to the extruder 2 and the extruder 1 were layered in a manner of forming a/b/a using a 3-layer joining block and melt-extruded out of a metal cap in a sheet-like form while the resin temperature was kept at 280° C. from the melting part through the kneading part, the polymer tube, the gear pump and the filter of the extruder and kept at 275° C. in the subsequent polymer tube. The thickness ratio of the a layer and the b layer was adjusted so that the ratios of a/b/a was 8/84/8 by controlling the gear pumps for the respective layers. A filter member of a stainless steel sintered body (nominal filtration precision: 10 micro meters particles are cut in a proportion of 95%) was used for all of the filters. The temperature of the metal cap was controlled so that the temperature of the resin extruded was adjusted to 275° C.

The resin extruded was cast on a cooling drum having a surface temperature of 30° C., closely attached to the surface of the cooling drum by electrostatic application method, and thus solidified with cooling to produce an unstretched film having a thickness of 480 micro meters.

The unstretched sheet obtained was heated by a group of rolls each was heated to 78° C. to increase the film temperature to 100° C., and thereafter stretched in MD at 3.5 times by a group of rolls each having a different peripheral speed.

Next, the uniaxially stretched film obtained was held by clips and stretched in TD of the film. The temperature for stretching in TD was set to 120° C. and the stretch ratio was set to 4.0 times. Successively, the film was subjected to a heat treatment at 240° C. for 15 seconds, and then subjected to a 4% relaxation treatment at 185° C. to obtain a biaxially stretched polyethylene terephthalate film having a thickness of 12 micro meters. The physical properties of the film obtained are shown in Table 1.

Comparative Example 4

A film was obtained in the same manner as in Example 7, except that the film was subjected to a heat treatment at 150° C. As a result, the film was cut in the middle of the heat fixation treatment.

Comparative Example 5

A film was obtained in the same manner as in Example 8, except that the film was subjected to a heat treatment at 150° C. As a result, the film was cut in the middle of the heat fixation treatment.

[Table 1]

| Item | | Example 1 | Example 2 | Example 3 | Example 4 | Example 5 | Example 6 | Example 7 | Example 8 | Comparative Example 1 | Comparative Example 2 | Comparative Example 3 | Comparative Example 4 | Comparative Example 5 |
|---|---|---|---|---|---|---|---|---|---|---|---|---|---|---|
| Intrinsic Viscosity of Exuded Sheet | (dL/g) | 0.71 | 0.71 | 0.71 | 0.71 | 0.71 | 0.71 | 0.52 | 0.71 | 0.71 | 0.71 | 0.59 | 0.52 | 0.71 |
| Intrinsic Viscosity of Streched Film | (dL/g) | 0.71 | 0.71 | 0.71 | 0.71 | 0.71 | 0.71 | 0.52 | 0.71 | 0.71 | 0.71 | 0.59 | — | — |
| Stretching Ratio in MD | (—) | 5 | 5 | 5 | 5 | 4 | 5 | 2.5 | 3.4 | — | 5 | 3.5 | 2.5 | 3.4 |
| Temperature during Stretching in MD | (°C.) | 120 | 120 | 120 | 120 | 110 | 110 | 95 | 110 | — | 100 | 100 | 95 | 110 |
| Stretching Ratio in TD | (—) | 5 | 5 | 5 | 5 | 4 | 4 | 3 | 4 | — | — | 4 | 3 | 4 |
| Temperature during Stretching in TD | (°C.) | 105 | 105 | 105 | 105 | 105 | 105 | 85 | 105 | — | — | 120 | 85 | 105 |
| Heat Fixation Temperature | (°C.) | 200 | 200 | 180 | 140 | 120 | 120 | 120 | 120 | — | — | 240 | 150 | 150 |
| Relaxation Ratio during TD Relaxation Treatment | (%) | 5 | 5 | 5 | 5 | 5 | 5 | 1 | 5 | — | — | 4 | — | — |
| Temperature during TD Relaxation Treatment | (°C.) | 190 | 190 | 170 | 130 | 110 | 110 | 110 | 110 | — | — | 185 | — | — |
| Thickness | (μm) | 12 | 15.5 | 11.9 | 11.6 | 19.2 | 19.5 | 18.8 | 22.8 | 250 | 50 | 12 | The film was cut in the middle of the heat fixation treatment | The film was cut in the middle of the heat fixation treatment |
| Plane Orientation Coefficient (ΔP) | (—) | 0.143 | 0.147 | 0.142 | .0139 | 0.0279 | 0.122 | 0.0235 | 0.0394 | 0.0007 | 0.04 | 0.168 | | |
| Breaking Strength MD | (MPa) | 275 | 260 | 215 | 209 | 190 | 310 | 94 | 129 | 49 | not measured | 230 | | |
| Breaking Strength TD | (MPa) | 252 | 255 | 218 | 225 | 195 | 258 | 134 | 141 | 42 | not measured | 240 | | |
| Breaking Elongation MD | (%) | 47 | 47 | 27 | 31 | 64 | 38 | 11 | 166 | 1 | not measured | 100 | | |
| Breaking Elongation TD | (%) | 46 | 42 | 31 | 26 | 64 | 47 | 69 | 154 | 1 | not measured | 90 | | |
| Refractive Index Nx | (—) | 1.6317 | 1.6292 | 1.6316 | 1.6231 | 1.5767 | 1.6177 | 1.5650 | 1.5700 | 1.5663 | 1.6053 | 1.6537 | | |
| Refractive Index Ny | (—) | 1.6219 | 1.6242 | 1.6205 | 1.6200 | 1.5705 | 1.6038 | 1.5780 | 1.5782 | 1.5640 | 1.5523 | 1.6732 | | |
| Refractive Index Nz | (—) | 1.4839 | 1.4801 | 1.4837 | 1.4825 | 1.5451 | 1.4836 | 1.5480 | 1.5347 | 1.5644 | 1.5385 | 1.4959 | | |
| Heat Shrinkage Rate MD | (%) | 3.3 | 4.3 | 5.5 | 22 | 29 | 29 | 21 | 43 | measurement error | 63 | 1.4 | | |
| Heat Shrinkage Rate TD | (%) | 4.3 | 4.3 | 7.1 | 26.1 | 36 | 49 | 27 | 45 | measurement error | 4 | 0.2 | | |
| Haze | (%) | 0.39 | 0.3 | 0.25 | 0.17 | 2.9 | 1.3 | 0.78 | 1.2 | 0.8 | 0.5 | 2.3 | | |
| Total Light Transmittance | (%) | 88.9 | 89.1 | 89 | 89.2 | 90.4 | 89.8 | 89.9 | 90.4 | 88 | 89 | 88 | | |
| Thickness | (μm) | 12 | 15.5 | 11.9 | 11.6 | 19.2 | 19.5 | 18.8 | 22.8 | 250 | 50 | 12 | | |
| Oxygen Permeability measured value | (mL/m²·day/Mpa) | 107 | 85 | 103 | 124 | 108 | 94 | 121 | 114 | 8.4 | not measured | 1200 | | |
| Oxygen Permeability per 50 μm | (mL/m²·day/Mpa) | 25.7 | 26.4 | 24.4 | 28.8 | 41.4 | 36.6 | 56.2 | 52.2 | 42 | not measured | 288 | | |
| Water Vapor Permeability measured value | (g/m²/day) | 15.6 | 10.8 | 15.3 | 17.8 | 13.8 | 11.5 | 8.4 | 15.0 | 2.1 | not measured | 46 | | |
| Water Vapor Permeability per 50 μm | (g/m²/day) | 3.7 | 3.3 | 3.6 | 4.1 | 5.3 | 4.5 | 3.2 | 6.8 | 10.5 | not measured | 11 | | |
| Oxygen Permeability Test for Packaging Container | | A | A | B | C | C | A | A | A | A | A | B | | |
| Heat Resistance Test for Film | | A | A | A | A | C | D | C | D | C | D | A | | |

The invention claimed is:

1. A polyester film, which is a biaxially oriented film of a polyester resin comprising a dicarboxylic acid component containing mainly a furandicarboxylic acid and a glycol component containing mainly ethylene glycol,
   wherein the film has
   a plane orientation coefficient ΔP of 0.100 or more and 0.160 or less,
   a thickness of 5 μm or more and 200 μm or less, and
   a heat shrinkage rate of not less than 0.01% and not more than 30% when heated at 150° C. for 30 minutes in a machine direction of film plane and in a transverse direction perpendicular to the machine direction.

2. The polyester film according to claim 1, wherein the polyester film has a heat shrinkage rate of not less than 0.01% and not more than 20% when heated at 150° C. for 30 minutes.

3. The polyester film according to claim 2, wherein the polyester film has an oxygen permeability of not less than 1 mL/m²/day/MPa and not more than 200 mL/m²/day/MPa per 50 micro meters of film thickness under a temperature of 23° C. and a humidity of 65%.

4. The polyester film according to claim 3, wherein the polyester film has a refractive index of not less than 1.5700 and not more than 1.7000 in a machine direction of film plane (nx) and in a transverse direction perpendicular to the machine direction (ny).

5. The polyester film according to claim 4, wherein the polyester film has a heat shrinkage rate of not less than 0.01% and not more than 10% when heated at 150° C. for 30 minutes.

6. The polyester film according to claim 5, wherein the polyester film has a heat shrinkage rate of not less than 0.01% and not more than 8% when heated at 150° C. for 30 minutes.

7. The polyester film according to claim 6, wherein the polyester film has a heat shrinkage rate of not less than 0.01% and not more than 4.5% when heated at 150° C. for 30 minutes.

8. The polyester film according to claim 7, wherein the polyester film has a plane orientation coefficient ΔP of not less than 0.100 and not more than 0.200.

9. A method for producing the polyester film according to claim 8, comprising a stretching process for stretching an unstretched film in the machine direction and in the direction perpendicular to the machine direction to obtain a stretched film, and a relaxation process for relaxing the stretched film.

10. The polyester film according to claim 1, wherein the polyester film has an oxygen permeability of not less than 1 mL/m²/day/MPa and not more than 200 mL/m²/day/MPa per 50 micro meters of film thickness under a temperature of 23° C. and a humidity of 65%.

11. The polyester film according to claim 1, wherein the polyester film has a refractive index of not less than 1.5700 and not more than 1.7000 in a machine direction of film plane (nx) and in a transverse direction perpendicular to the machine direction (ny).

12. The polyester film according to claim 1, wherein the polyester film has a heat shrinkage rate of not less than 0.01% and not more than 10% when heated at 150° C. for 30 minutes.

13. The polyester film according to claim 1, wherein the polyester film has a plane orientation coefficient ΔP of not less than 0.100 and not more than 0.200.

14. A method for producing the polyester film according to claim 1, comprising a stretching process for stretching an unstretched film in the machine direction and in the direction perpendicular to the machine direction to obtain a stretched film, and a relaxation process for relaxing the stretched film.

* * * * *